UNITED STATES PATENT OFFICE 1,972,932

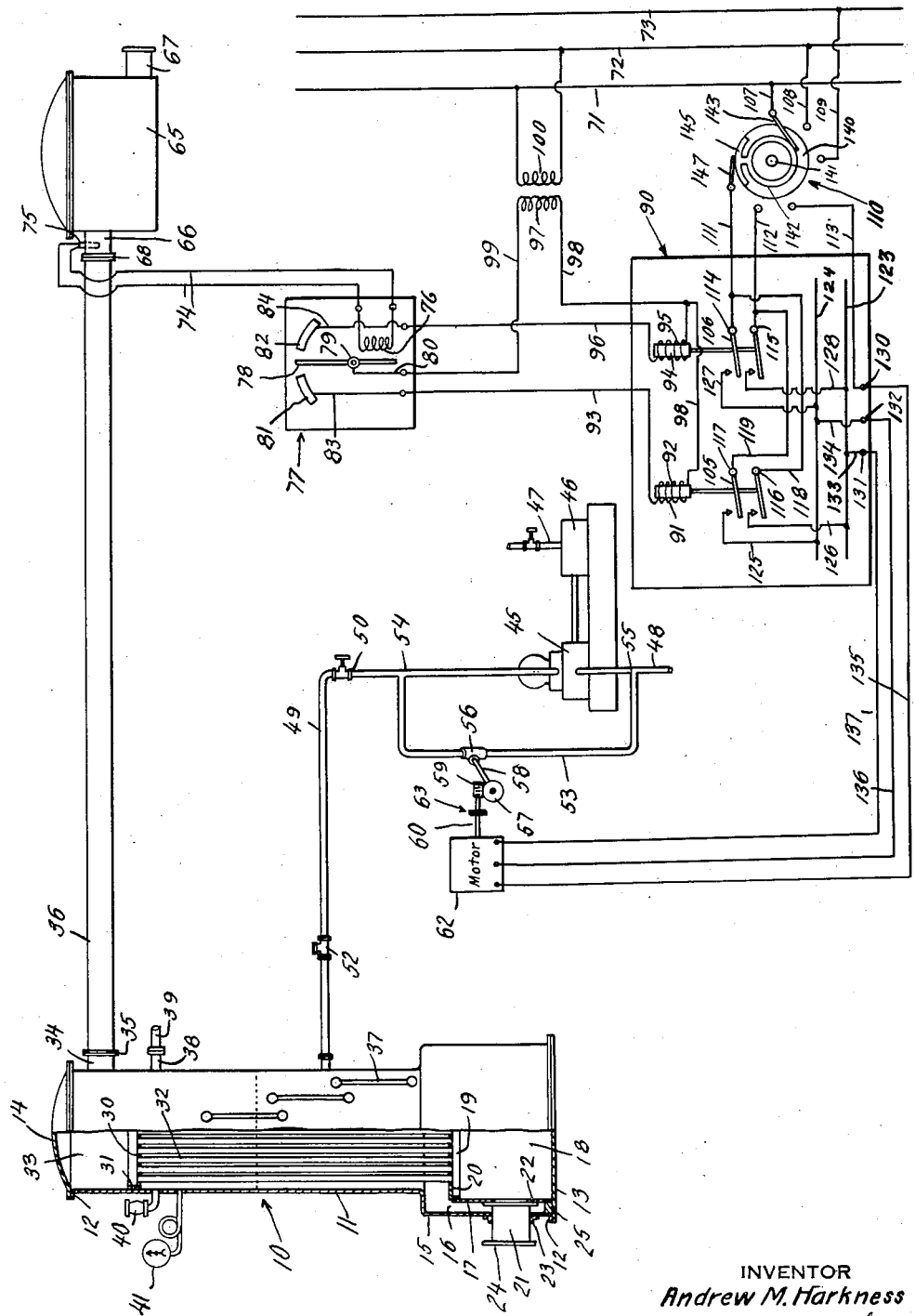

APPARATUS FOR TREATING GASES

Andrew M. Harkness, Nyack, N. Y., assignor to General Chemical Company, New York, N. Y., a corporation of New York Application June 20, 1930, Serial No. 462,524

12 Claims. (Cl. 23—253)

This invention relates to heat transfer systems, and more particularly to apparatus for transferring controllable quantities of heat from one medium to another.

In the oxidation of sulfur dioxide to sulfur trioxide by the contact process, the primary mixture of gases, chiefly sulfur dioxide and oxygen, is formed by burning pyrites or brimstone in suitable burners. The exit gas mixture of the burner is at a high temperature, and subsequent cooling of the gases is necessary where the nature of the gas mixture is such as to require purification before oxidation to sulfur trioxide, and also where the gas mixture is such that it may be conducted directly to a conversion stage without intermediate purification. Various methods and apparatus have been employed for extracting and, in some instances, conserving the excess or waste heat in the gas stream. Such means generally have included various arrangements of radiators, heat exchangers and waste heat boilers. However, prior operations have been such that an accurate control of the quantity of heat extracted from the gases has not been attainable, and it has been necessary to include in the plant equipment, some apparatus beyond the primary cooling or purification apparatus and just ahead of the conversion stage, for the further cooling or reheating of the gases. In other words, prior methods and apparatus, particularly as applied to the cooling of the gases, have been so inflexible as to require added equipment to effect further temperature adjustments immediately prior to the introduction of the gas into a conversion stage.

The principal object of the present invention lies in the provision of a method and apparatus for accurately controlling the degree of heat transfer between different media particularly as between a hot gas which is required to be cooled and a cooling liquid, and for efficiently utilizing the heat transferred or extracted from the heated gas. The invention contemplates the employment of a waste heat boiler or similar heat exchange device, and includes a method and apparatus by which the amount of heat extracted from the gas during the passage of the same through the heat exchange device may be varied so as to maintain a predetermined gas temperature at any desired point in the gas stream at or beyond the outlet of the heat exchange device. In a less general sense, the invention includes the cooling of hot gases by passing the same through the tubes or passages of a waste heat boiler or similar heat exchange device in which the cooling medium, preferably a liquid, is disposed on the opposite side of the tubes or heat transfer surfaces, and regulating the quantity of heat extracted from the gases by varying the extent of immersion of the heat transfer surface in the cooling liquid, or more specifically, by varying the level of the cooling liquid in the liquid space surrounding the gas passages or conduits.

Further objects and features of novelty will be apparent from the following description taken in connection with the accompanying drawing illustrating a waste heat boiler partly in section, together with a diagrammatic representation of a converter, apparatus for injecting water into the waste heat boiler, and control mechanism therefor.

Referring to the drawing, the waste heat boiler indicated generally at 10 comprises a vertical steel shell 11 having at the upper and lower ends thereof horizontal flanges 12 by means of which the base 13 and the top 14 may be riveted or otherwise attached to the shell 11 in any approved manner. The lower end of the shell 11 has an enlarged base section 15 affording an annular water jacket 16 surrounding the cylindrical casing 17 forming the side walls of the gas inlet header 18.

A depending flange 19 is formed in the periphery of the lower tube sheet 20 thus providing suitable means for connecting the tube sheet to the upper edge of the cylindrical casing 17. A gas inlet conduit 21 passes through the enlarged base portion 15 of the shell 11, through the annular water space 16, and is set into an opening in the cylindrical casing 17 and attached thereto by the annular flange 22. The conduit 21 is secured to the shell by the circular flange 23. The conduit 21 includes on its outer end a flange 24 or any other suitable means to facilitate a gas-tight connection between the inlet conduit 21 and a main gas line leading from a suitable source of sulfur dioxide gas not shown.

The cylindrical casing 17 is held in place with reference to the circumference of the enlarged base portion of the shell by a circular mud ring 25 connected to the lower outer edge of the cylindrical casing 17, the upper side of base 13 and to the inner side of the lower edge of the shell. The construction just described including the annular water jacket 16 is not essential to the invention. However, the water jacket 16 serves to minimize any tendency of the hot gases to overheat those portions of the boiler forming the inlet header 18, and to increase the heat transfer between the gas passing through the boiler and the water therein. Alternatively, the lower tube sheet 20 may be fixed directly to the inner surface of the shell 11.

The upper tube sheet 30 has formed on its periphery the circular flange 31 by which the tube sheet may be fixed in place within the upper end of the boiler shell. The tubes 32 are set into the upper and lower tube sheets 30 and 20 in the manner well known in approved boiler practice. The tube sheets 20 and 30, the exterior of the tubes 32, and the interior of the shell 11 together form the water and steam space. The upper ends of the tubes 32 open into the gas outlet header 33 formed by the upper tube sheet 30, the boiler shell top 14 and the upper end of the shell 11. The outlet header 33 is in communication with an outlet connection 34 set into the upper end of the shell 11 and including on its outer end a flange 35 or other suitable means for attaching the outlet connection 34 to the gas main 36.

Reference numerals 37 indicate glass-tube water gauges of known construction placed in staggered relation about the circumference of the boiler for the purpose of indicating the water level therein. The steam space in the upper end of the shell is in communication with a steam outlet connection 38 affording means for withdrawing steam from the boiler, and conducting the same to any part of the plant through the steam line 39. The numerals 40 and 41 indicate respectively a safety valve and a pressure gauge both arranged so as to be in communication with the steam space in the boiler.

During the operation of the process, water is supplied to the boiler by the pump 45. The pump may be steam operated at a substantially constant speed as by the cylinder and an associated piston and connecting rod indicated at 46. Steam may be supplied to the cylinder 46 through pipe 47 from the steam line 39 or any other convenient source. The pump 45 may also be operated by any other prime mover. The suction side of the pump 45 is connected to a water supply through the pipe 48. The pressure side of the pump is connected to the water space within the shell 11 through the pipe 49 including the hand-operated valve 50 and the check valve 52. This purpose of the latter valve is to prevent a blowout of the water in the boiler in case of a rupture in the pipe 49 any place between the valve 52 and the source of water supply.

The by-pass conduit 53 is connected to the pipe 49 between the outlet of pump 45 and the valve 50 as indicated at 54. The opposite end of the by-pass 53 is in communication with the suction side of the pump 45 through the pipe 48 as by a connection at 55. The passage of water through by-pass 53 is regulated by the valve 56. A worm gear 57 is keyed to the outer end of the valve stem 58, and meshes with the worm 59 mounted on the end of the shaft 60 of the electric motor indicated generally at 62. The shaft 60 includes a slip clutch 63, the purpose of which will hereinafter appear.

The reference numeral 65 indicates a converter or other gas treatment chamber having a gas inlet 66 and a gas outlet 67. The particular construction of the converter 65 is not material to the present invention. In the particular embodiment of the invention described, the chamber 65 represents a means for converting sulphur dioxide to sulphur trioxide. The interior construction of the chamber may be such as to support suitable catalytic material therein in an approved manner. Inlet 66 of the converter is connected to the main gas line 36 as by the flange connection 68.

The mechanism for controlling the degree of cooling of the gases in the waste heat boiler by regulating the quantity of feed water injected into the boiler will now be described.

Electrical energy for operating the motor 62 and the control mechanism therefor is supplied by a main power line comprising the conductors 71, 72, and 73.

Circuit 74 includes a thermo-couple 75 inserted in the inlet 66 of the converter 65, and the coil 76 of a galvanometer indicated generally at 77. As the gas temperatures in the converter inlet 66 are, as a rule, comparatively high, the thermocouple 75 may conveniently consist of a wire of platinum, and a wire of an alloy of platinum and rhodium in suitable proportions. Temperature changes in the gas inlet of the converter alter the E. M. F. in the circuit 74 and, operating through the coil 76, cause a change in position of the arm 78 pivoted at 79. The mode of operation of the galvanometer with respect to current changes in circuit 74 is well known. The free end of the arm 78 is made of conducting material, and is connected to a suitable binding post through conductor 80. Contacts 81 and 82 are adjustable within certain limits about the pivot point 79 as a center. Contacts 81 and 82 are connected to binding posts through conductors 83 and 84.

The reference numeral 90 indicates generally a relay mechanism for controlling the transmission of current from the main power line to the motor 62 as required by changing temperature conditions in the converter inlet 66. One end of the coil 91 of a solenoid, including a core 92, is connected to the conductor 83 through the conductor 93. The coil 94 of a similar solenoid having a core 95 is connected to the conductor 84 of the galvanometer through conductor 96. The opposite ends of coils 91 and 94 are electrically connected to one end of coil 97 of a transformer through the conductor 98. The opposite end of the coil 97 is connected to the conductor 80 of the galvanometer through the conductor 99. The coil 100 of the transformer is suitably connected across the main power line as indicated.

Cores 92 and 95 of the solenoids are mechanically connected to the switches 105 and 106 to close the same when current passes through the coils 91 and 94 respectively. The arrangement is such that switches 105 and 106 are opened as shown in the drawing when coils 91 and 94 are de-energized.

The motor 62 is a reversible motor of standard construction. Current for the operation of the motor is transmitted thereto from the source of power through switch 105 or switch 106. The relay mechanism, including the said switches, is connected to the main power line through the conductors 107, 108, 109, the interrupter indicated generally at 110, and conductors 111, 112, and 113. Conductors 111 and 112 are connected directly to the binding posts 114 and 115 of the switch 106, and are also connected to the binding posts 116 and 117 of the switch 105 through the crossed conductors 118 and 119. Switch 105 is connected to the buss bars 123 and 124 through the conductors 125 and 126. The switch 106 is similarly connected to the buss bars 123 and 124 through the conductors 127 and 128. Conductor 113 is directly connected to the binding post 130. Buss bars 123 and 124 are connected respectively to binding posts 131 and 132 through the conductors 133 and 134.

The relay mechanism is electrically connected to the motor 62 through the conductors 135, 136, and 137.

Interrupter 110 is shown diagrammatically and in part only. The numeral 140 indicates a disk of insulating material keyed to a shaft 141. Shaft 141 is constantly rotated, at a rate hereinafter specified, by a small independently operated motor connected thereto through suitable reducing gears. The motor and the reduction gearing are not shown. Disk 140 includes a ring 142 of conducting material constantly electrically connected to the conductor 107 through the brush 143. A segment 145, also of conducting material, is set into the rim of the disk 140, and is electrically connected to the ring 142 as indicated on the drawing. The brush 147 is connected to the conductor 111, and is so arranged as to be continuously in contact with the rim of the disk 140. For a portion of each revolution of disk 140, the brush 147 will be in contact with the segment 145, thus electrically connecting conductors 107 and 111 through the brush 143, ring 142, segment 145, and brush 147. Conductors 108 and 112, and conductors 109 and 113 are connected by two disks similar to disk 140 also keyed to the shaft 141. For convenience, the disks connecting conductors 108 and 112, and conductors 109 and 113 have been omitted. It will be understood that the segments 145 on all three connecting disks of the interrupter are arranged radially in the same position on the shaft 141. It will be seen, therefore, that during the rotation of shaft 141, the relay mechanism 90 is periodically connected to and disconnected from the main power line through the interrupter 110.

It will also be understood that the invention is in no manner dependent upon the specific location of the thermo-couple 75. The latter may be associated with any part of the apparatus, either in the outlet 34 or any other point in the gas stream at which it is desired to maintain a substantially constant temperature. It will also be understood that the thermo-couple 75 need not be of the type specially described. Any suitable thermo-responsive device may be employed. Further, mechanism other than the galvanometer 77 may be utilized for operating the switches 105 and 106.

Although it is to be understood that the improved process and apparatus is applicable for the treatment of other gases, for convenience the operation of the invention will be described in connection with the cooling of a gaseous mixture of sulfur dioxide and oxygen prior to oxidation of the same to sulfur trioxide by the contact process.

The general mode of procedure for the production of sulfuric anhydride by the contact process is well known. Such processes as a rule include, briefly, the formation of a gas mixture containing sulfur dioxide and oxygen, the purification of the gas mixture where necessary, the adjustment of the temperature at which the gas is initially brought into contact with the catalytic material to a predetermined optimum, and ultimately contacting the mixture with a suitable catalytic material while maintaining proper temperature conditions to efficiently effect oxidation of the sulfur dioxide to sulfur trioxide. Sulfur dioxide gases are generally obtained from the roasting of sulfur-bearing sulfide ores or from the burning of brimstone. Where the gases are obtained from the latter source, practice in some instances has been to burn the brimstone under such conditions that a gas mixture containing a comparatively small quantity of sulfur dioxide and a large amount of vaporized sulfur is formed. This mixture is subsequently conducted into a combustion chamber into which a sufficient quantity of oxygen is introduced to complete the combustion of the sulfur vapor to sulfur dioxide and to furnish the necessary excess of oxygen for the conversion process. During the combustion of the sulfur vapor to sulfur dioxide, large quantities of heat are generated. The result is that the exit gases of the combustion chamber are heated to a temperature much in excess of the optimum temperature for conversion of the gaseous mixture of sulfur dioxide and oxygen. Under many operating conditions, combustion chamber exit gas temperatures of 2000° F. are not unusual. It may be considered generally that an optimum temperature for conversion of the mixture of sulfur dioxide and oxygen to sulfur trioxide is somewhere about 750° to 800° F., depending upon specific operating conditions. It appears, therefore, that when the gaseous mixture of sulfur dioxide and oxygen is obtained from the burning of brimstone in the manner described, the gas stream contains large quantities of heat which must be removed therefrom before the gas mixture may be introduced into the conversion chamber.

According to prior practice, it has been usual to cool the hot gases down to the optimum conversion temperature by passing the gas stream through a series of coolers or heat interchangers. The present invention contemplates the removal of all the excess heat from the gas over and above that necessary for initiating the conversion reaction in the single piece of apparatus, as for example in the waste heat boiler 10, and the control of the degree of cooling the gases in the waste heat boiler so that an initial optimum conversion temperature is maintained at the inlet of the converter.

For the purpose of describing one specific embodiment of the invention, it may be assumed that a gas mixture of sulfur dioxide and oxygen enters the inlet 21 of the waste heat boiler at a given high temperature, say about 2000° F., and that it is desired to maintain a temperature in the inlet 66 of the converter 65 of about 800° F. It will appear, therefore, that a comparatively large quantity of heat is to be extracted from the gas mixture during the passage of same through the tubes 32 of the waste heat boiler.

The hot gases enter the waste heat boiler through the inlet conduit 21, pass through the tubes 32, and during such passage give up heat to the water surrounding the tubes and generate steam, which leaves the boiler through the steam outlet connection 38. The gases in the upper end of the tubes continue to impart heat to the steam above the water level in the boiler thus superheating the steam to a certain degree. The cool gases leave the outlet header 33 through the outlet connection 34, and pass through the gas line 36 into the inlet 66 of the converter 65.

The pump 45 operates at a constant speed and ordinarily would feed water into the boiler through the pipe 49 at a constant rate. It will be seen from the arrangement of the by-pass 53 around the pump 45, that if valve 56 were entirely opened, the water discharged from the pump would follow the line of least resistance and pass from the pressure side of the pump through by-pass 53 back to the suction side of the pump and be returned into the pipe 48. On the assumption that the hot gases enter the boiler at a temperature of say around 2000° F., and that it is desirable to maintain a temperature of about 800° F. in the inlet 66, the valve 50 is opened completely, or to any desired extent, and valve 56 is so adjusted manually that if the temperature of the gases entering the waste heat boiler were to remain constant, only a limited quantity of water is by-passed through valve 56, and a sufficient amount of water is pumped through the pipe line 49 into the boiler to maintain a fixed water level therein, so as to cool the gases to the required degree, and to make up for the amount of water converted into steam. The valve 56 in the normal operation of the apparatus is partially opened to some extent so that there is a certain amount of circulation through the by-pass 53 from the pressure side of the pump 45 back to the suction side.

The thermo-couple 75 and the galvanometer coil 76 are so constructed and adjusted that when a temperature of about 800° F. prevails in the inlet of the converter 65, the arm 78 is approximately in the vertical position as shown in the drawing. For convenience, during the immediately following description of the operation of the control mechanism, it may be considered that the interrupter 110 is in such position that the relay mechanism 90 is connected across the main power line.

As noted, contacts 81 and 82 are movable about the pivot point 79 as a center for the purpose of securing proper adjustment of the instrument. According to one preferred mode of operation, contacts 81 and 82 may be so adjusted as to permit a fluctuation in the temperature of the gas in the converter inlet over a range of about 10 degrees without causing the arm 78 to be electrically connected with either contact 81 or 82. The contact 81 is so positioned that when a temperature of about 795° F. prevails in the inlet 66, and the arm 78 is moved over to the left, engagement of the arm 78 and the contact 81 is effected. Contact 82 is adjusted so that when the temperature in the inlet conduit of the converter 65 rises to about 805° F., the arm 78, swinging over to the right, will engage the contact 82. It will be seen that during comparatively small changes in temperature in the inlet of the converter, the arm 78 will swing back and forth through a small arc, and will engage neither contacts 81 or 82 to cause the relay mechanism 90 to adjust itself so as to send current through the motor 62 to change the position of the valve 56. According to this adjustment, as long as a temperature approximately within the limits of 795° F. and 805° F. is maintained in the inlet of the converter, the position of the valve 56 will be unchanged, and there will be no increase or decrease in the quantity of water fed into the boiler 10.

If the temperature of the gas in the inlet 66 rises above 805° F., it will be necessary to close the valve 56 to decrease the quantity of water pumped through the by-pass 53, and to increase the quantity of water fed into the boiler through the pipe 49 to raise the water level in the boiler, and thus effect a further cooling of the gases passing through the tubes 32.

When the temperature in the inlet of the converter 65 is about or exceeds 805° F., the E. M. F. set up in the circuit 74 is sufficient to move the arm 78 to the right far enough to strike the contact 82. When the arm 78 engages the contact 82, the coil 94 is energized by current flowing through the closed circuit including contact 82, conductor 84, conductor 96, coil 94, the conductor 98, coil 97, conductor 99, conductor 80, and the arm 78. When the coil 94 is energized, the core 95 is raised, and the switch 106 is closed, assuming, as mentioned, that current is passing through the interrupter 110, when the switch 106 is closed, conductor 71 of the main power line is connected to the binding post 132 through conductors 107, 111, 127, buss bar 124, and conductor 134. Similarly, conductor 72 in the main power line is connected to the binding post 131 through the conductors 108 and 112, switch 106, conductor 128, buss bar 123, and conductor 133. The motor 62 is thus connected across the main power line, and rotates the worm gear 57 in a direction to close the valve 56. As the passage in the valve 56 is reduced, smaller quantities of water circulate through the by-pass 53, and correspondingly larger quantities of water are pumped through the pipe 49 into the boiler 10 to raise the water level therein, and consequently cool the gas passing through the tubes 32 to a greater degree.

It will be apparent that as long as there is a contact between the arm 78 and the contact 82, the switch 106 will be closed, and the motor 62 will operate to reduce the passage through the valve 56 as described, provided the segments in the interrupter disks 140 are in such position as to electrically connect the relay mechanism with the main power line through the brushes 143 and 147.

The shaft 141 of the interrupter is geared to its operating motor in such manner that disks 140 make one revolution in approximately 1¼ minutes. The segments 145 are of such length that for about 15 seconds, the brushes 147 and the segments 145 are in contact, and current passes from the main power line into the relay mechanism 90. The insulated portion of the disks 140 is about four times the length of the segment 145. With this arrangement, it will be seen that brushes 147 are in contact with the segments 145 for about 15 seconds, during which time current will pass from the main power line into the relay mechanism, and for a succeeding minute brushes 147 will be in contact with the insulated portions of disks 140, and no current will flow from the main power line into the relay mechanism.

As long as temperature conditions in the inlet of the converter 65 are such as to cause the thermo-couple 75 to effect engagement of the arm 78 and contact 82, the switch 106 will be closed, and the motor 62 will operate to more nearly close the valve 56, provided the disks 140 in the interrupter are so positioned as to permit the passage of current from the main power line to the relay mechanism. From the foregoing description of the operation of the interrupter 110, it will be seen that the motor 62 can operate only for a period of 15 seconds at minute intervals. Therefore, on any closure of the circuit through the arm 78 and the contact 82, the motor 62 can only operate for a 15 second interval, and is then stopped for a period of one minute. If at the end of the minute, during which time the insulated portions of disks 140 are passing under brushes 147, arm 78 and contact 82 are still engaged, the motor 62 will again operate to further reduce the passage in the valve 56, and again increase the quantity of water being pumped into the boiler 10.

The purpose of this arrangement is to prevent abrupt and sudden changes in the water level in the boiler 10. During one period of operation of the motor 62 to close the valve 56, the quantity of water fed into the boiler 10 will be slightly increased. The minute interval following the 15 second operation of the motor 62 provides a period during which the changes in temperature effected in the gas in the boiler 10 may be transmitted to the thermo-couple in the inlet of the converter 65.

When the cooling of the gas becomes effective in the inlet of the converter 65, the E. M. F. in circuit 74 drops sufficiently to break the engagement of the arm 78 and the contact 82. Coil 94 is then de-energized, and the switch 106 is opened. Irrespective of the position of the disks 140 of the interrupter, no current can then pass through the relay mechanism 90 to the motor 62.

With a fall in temperature in the inlet of the converter to about 795° F. or less, a similar action takes place which operates to cause the motor 62 to open the valve 56. When the E. M. F. in circuit 74 decreases sufficiently to permit engagement of the arm 78 and the contact 81, the coil 91 is energized by current flowing through conductors 99, 80, arm 78, contact 81, conductors 83, 93, coil 91, conductor 98, and coil 97. The energized coil 91 raises the core 92 sufficiently to close the switch 105. When switch 105 is closed, and the disks 140 of the interrupter 110 are so positioned as to transmit current into the relay mechanism, current from the main power line conductor 72 is conducted to binding post 132 of the relay mechanism from the conductor 108, interrupter 110, conductors 112, 119, switch 105, conductor 125, buss bar 124, and conductor 134. Conductor 71 of the main power line is similarly connected to binding post 131 through conductor 107, interrupter 110, conductors 111, 118, switch 105, conductor 126, buss bar 123, and conductor 133. It will be seen that current is thus caused to pass through the motor 62 in the opposite direction, reversing the rotation of the shaft 60, and turning the gear 57 in such direction as to more widely open the valve 56. As the valve 56 is opened, a greater quantity of water is circulated through the by-pass 53, and a smaller quantity is pumped into the boiler through the pipe 49. The water level in the boiler 10 is lowered, and a correspondingly smaller amount of heat is extracted from the gases passing through the tubes 32.

The action of the interrupter 110 is the same as already described in connection with the operation of switch 106 and the closing of the valve 56, that is, successive small decreases in the quantity of the water pumped into the boiler 10 are made at such intervals as to permit the decrease in the cooling of the gas in the boiler 10 to be transmitted to the thermo-couple 75 and to be effective thereon.

As the temperature in the inlet of the converter 65 rises and approaches normal, engagement between the arm 78 and the contact 81 is broken, the coil 91 is de-energized, and switch 105 is opened and the motor 62 is stopped.

The slip clutch 63 is inserted in the shaft 60 to prevent breakage in case the valve 56 is fully opened or fully closed at any time while the motor is still in operation. The slip clutch also facilitates initial manual adjustment of the valve 56. The clutch construction may be such that the valve 56 may be totally disconnected from the motor to permit manual operation of the valve 56 for regulating the water feed to the boiler. If at any time it is desirable to manually control the water feed, it will of course be necessary to determine temperature conditions in the inlet 66 by some suitable means other than the thermo-responsive device 77.

It will be understood that the invention is not limited to the treatment or cooling of any specific gases. The principles of the invention have been explained in connection with the conversion of a mixture of sulfur dioxide and oxygen to sulfur trioxide for convenience only and not by way of limitation. The invention is equally applicable to the regulation of the temperature of the exit gases of a heat exchange device as shown, or to the control of temperature conditions within a chamber, where for example a gas reaction is being effected in the tubes 32 or their equivalent.

In the appended claims the term "immersed" is intended to include any degree of immersion, and to include any condition of partial or total immersion.

I claim:

1. In apparatus for converting sulphur dioxide to sulphur trioxide by a contact process, in combination, a source of hot sulphur dioxide-containing gas, a waste heat boiler connected to said source and through which a stream of the said hot gas is passed, a converter through which the stream of gas is passed after passage through the waste heat boiler, a temperature responsive device adapted to be actuated by changes in temperature occurring in said gas stream, and means actuated by said temperature responsive device for controlling the degree of heat transfer in said boiler whereby a predetermined temperature may be maintained in said gas stream.

2. In apparatus for converting sulphur dioxide to sulphur trioxide by a contact process, in combination, a source of hot sulphur dioxide-containing gas, a waste heat boiler adapted to contain a cooling liquid connected to said source and through which a stream of said hot gas is adapted to pass, a converter the inlet of which communicates with the outlet of the waste heat boiler, a temperature responsive device located adjacent the inlet of the converter and adapted to be actuated by changes in temperature of said gas stream at the converter inlet, and electrically controlled means actuated by said temperature responsive device for varying the level of the liquid in said boiler.

3. In apparatus for the catalytic conversion of gases by contacting the gases with a catalytic material, in combination, a source of convertble gas, a heat-exchange device connected to said source and through which a stream of said gas is passed, a converter through which said stream of gas is passed after passage through the heat exchange device, a temperature responsive device adapted to be actuated by changes in temperature of the said gas stream, and means actuated by said temperature responsive device for controlling the degree of heat transfer in said heat-exchange device, whereby said gas stream may be maintained at a predetermined temperature.

4. In apparatus for the catalytic conversion of gases by contacting the gases with a catalytic material, in combination, a source of convertible gas, a heat-exchange device connected to said source and through which a stream of said gas is passed, a converter through which the stream of gas is passed after passage through the heat-exchange device, a temperature responsive device associated with the converter and adapted to be actuated by changes in temperature of the gas stream as it enters the converter, and means actuated by said temperature responsive device for controlling the degree of heat transfer in said heat-exchange device, whereby the gas stream entering the converter is maintained at a predetermined temperature.

5. Apparatus for controlling the degree of heat transfer between media of different temperatures one of which is a liquid comprising a shell, a liquid space within the shell, a conduit for the second medium passing through the liquid space, means for regulating the liquid level in the liquid space including means for feeding liquid to the liquid space, means acting on a change in temperature of the second medium after having passed through the liquid space for varying the quantity of liquid supplied to the liquid space, and means for causing intermittent action of the last-named means to avoid undue fluctuations of the temperature of the second medium.

6. Apparatus for controlling the degree of heat transfer between media of different temperatures one of which is a liquid comprising a shell, a liquid space within the shell, a conduit for the second medium passing through the liquid space, means for regulating the liquid level in the liquid space including a pump for feeding liquid to the liquid space, a by-pass associated with said pump, means acting on a change in temperature of the second medium after having passed through the liquid space for changing the quantity of liquid passing through the by-pass to vary the quantity of liquid supplied to the liquid space, and means for causing intermittent action of the last-named means to avoid undue fluctuations of the temperature of the second medium.

7. Apparatus for controlling the degree of heat transfer between media of different temperatures one of which is a liquid comprising a shell, a liquid space within the shell, a conduit for the second medium passing through the liquid space, means for regulating the liquid level in the liquid space including a pump for feeding liquid to the liquid space, a by-pass circuit including the pump therein, means acting on a change in temperature of the second medium after having passed through the liquid space for changing the quantity of liquid passing through the by-pass to vary the quantity of liquid supplied to the liquid space, and means for causing intermittent action of the last-named means to avoid undue fluctuations of the temperature of the second medium.

8. Apparatus of the character described comprising a shell, a liquid space within the shell, a gas conduit passing through the liquid space, means for regulating the liquid level in the liquid space including a pump for feeding liquid to the liquid space, a by-pass connected to the pressure and suction sides of the pump, a temperature responsive device actuated by temperature changes in the gas after having passed through the liquid space, means actuated by said temperature responsive device for changing the quantity of liquid passing through the by-pass to vary the quantity of liquid supplied to the liquid space, and means for causing intermittent action of the last-named means to avoid undue fluctuations of the temperature of the gas.

9. Apparatus of the character described comprising a shell, a liquid space within the shell, a gas conduit passing through the liquid space, means for regulating the liquid level in the liquid space, including a pump driven at a constant rate for feeding liquid to the liquid space, a valve-controlled by-pass connected to the pressure and suction sides of the pump, a temperature responsive device actuated by temperature changes in the gas after having passed through the liquid space, means actuated by said temperature responsive device for controlling the valve for changing the quantity of liquid passing through the by-pass to vary the quantity of liquid supplied to the liquid space, and means for causing intermittent action of the last-named means to avoid undue fluctuations of the temperature of the gas.

10. In a system for converting sulfur dioxide to sulfur trioxide by the contact process, in combination, a source of hot sulfur dioxide containing gas, a waste heat boiler adapted to contain a cooling liquid connected to said source and through which a stream of said hot gas is adapted to pass, a converter the inlet of which is connected to the outlet of the waste heat boiler, a temperature responsive device located adjacent the inlet of the converter and adapted to be actuated by changes in temperature of said gas stream at the converter inlet, means actuated by said temperature responsive device for varying the level of the liquid in said boiler, and means for causing intermittent action of the last-named means to avoid undue fluctuations of the temperature of the gas at the inlet of the converter.

11. In apparatus for converting sulphur dioxide to sulphur trioxide by the contact process, in combination, a source of hot sulphur dioxide-containing gas, a waste heat boiler connected to said source and through which a stream of the said hot gas is passed, a converter through which the stream of gas is passed after passage through the waste heat boiler, a temperature responsive device associated with the gas stream at a point beyond the waste heat boiler and adapted to be actuated by changes in temperature occurring in said gas stream, and means actuated by said temperature responsive device for controlling the degree of heat transfer in said boiler whereby a predetermined temperature may be maintained in said gas stream.

12. In apparatus for converting sulphur dioxide to sulphur trioxide by the contact process, in combination, a source of hot sulphur dioxide containing gas, a heat-exchange device connected to said source and through which a stream of said gas is passed, a converter through which said stream of gas is passed after passage through the heat exchange device, a temperature responsive device associated with the gas stream at a point beyond the heat-exchange device and adapted to be actuated by changes in temperature of the said gas stream, and electrically controlled means actuated by said temperature responsive device for controlling the degree of heat transfer in said heat-exchange device, whereby said gas stream may be maintained at a predetermined temperature.

ANDREW M. HARKNESS.